(12) United States Patent
Simske

(10) Patent No.: US 9,344,277 B2
(45) Date of Patent: May 17, 2016

(54) MASS SERIALIZATION ANALYTICS

(75) Inventor: Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/885,982

(22) PCT Filed: Apr. 11, 2011

(86) PCT No.: PCT/US2011/031962
§ 371 (c)(1),
(2), (4) Date: May 16, 2013

(87) PCT Pub. No.: WO2012/141680
PCT Pub. Date: Oct. 18, 2012

(65) Prior Publication Data
US 2014/0023191 A1    Jan. 23, 2014

(51) Int. Cl.
| | | |
|---|---|---|
| H04K 1/00 | (2006.01) | |
| H04L 9/00 | (2006.01) | |
| H04L 9/38 | (2006.01) | |
| H04L 9/28 | (2006.01) | |
| G06F 21/73 | (2013.01) | |
| H04L 9/06 | (2006.01) | |
| G06F 7/58 | (2006.01) | |

(52) U.S. Cl.
CPC .. H04L 9/28 (2013.01); G06F 7/58 (2013.01); G06F 21/73 (2013.01); H04L 9/0662 (2013.01); *H04L 2209/26* (2013.01)

(58) Field of Classification Search
CPC ...................................................... G06F 21/30
USPC .................................................. 380/258, 26
See application file for complete search history.

(56) References Cited

U.S. PATENT DOCUMENTS 4,701,909 A * 10/1987 Kavehrad et al. ............. 370/446
4,905,176 A      2/1990 Schulz
(Continued)

FOREIGN PATENT DOCUMENTS

| | | |
|---|---|---|
| EP | 0981081 | 2/2000 |
| JP | 10-240500 | 9/1998 |
| JP | 2003008593 A | 1/2003 |

OTHER PUBLICATIONS

"New Medicine Coding System to Help Address the Growing Risk of Counterfeit Medicines" Oct. 21, 2009.
(Continued)

*Primary Examiner* — Morshed Mehedi
*Assistant Examiner* — Khalil Naghdali
(74) *Attorney, Agent, or Firm* — International IP Law Group, PLLC

(57) ABSTRACT

A method of determining whether a mass serialization engine is cryptographically secure is provided herein. The method includes performing (202) a specified number of mass serializations to generate a corresponding number of mass serialization sets. A size of the mass serialization sets is increased from a first portion size to a second portion size by the mass serialized engine. The method further includes determining (204) a corresponding number of collisions for each of the specified number of mass serializations. Additionally, the method includes comparing (206) the number of collisions to an expected number of collisions. Further, the method includes determining (208) whether the mass serialization engine is cryptographically secure based on the comparison.

14 Claims, 5 Drawing Sheets

(56) References Cited

U.S. PATENT DOCUMENTS

| | | |
|---|---|---|
| 5,031,129 A | 7/1991 | Powell et al. |
| 6,647,402 B1 | 11/2003 | Chiu |
| 7,702,705 B2 | 4/2010 | Suzuki |
| 2007/0066906 A1* | 3/2007 | Goldberger et al. .......... 600/509 |
| 2007/0071068 A1* | 3/2007 | Lablans .................. 375/132 |
| 2007/0162806 A1 | 7/2007 | Matsumoto et al. |
| 2008/0137844 A1 | 6/2008 | Girault et al. |
| 2009/0165086 A1 | 6/2009 | Trichina et al. |
| 2010/0110474 A1 | 5/2010 | Coulter et al. |
| 2013/0103615 A1* | 4/2013 | Mun .......................... 705/36 R |

OTHER PUBLICATIONS

Donald E. Knuth: "The Art of Computer Programming, vol. 2, 2nd Edition, Section 3.3 Statistical Tests" Jan. 1, 1981.

W W Tsang, et al: "Tuning the Collision Test for Power", Conf in Research and Practice in Information Technology, Jan. 1, 2004.

* cited by examiner

MASS SERIALIZATION ANALYTICS

BACKGROUND

Mass serialization is the process by which a list of codes for a serialized set of items is generated. Serialization means that the numbers follow one another serially, or are associated with a sequence. A mass serialization of binary strings (of indeterminate length) may be represented as shown in Table 1.

TABLE 1

| |
|---|
| 00000 ... 00000 |
| 00000 ... 00001 |
| 00000 ... 00010 |
| ... |
| 11111 ... 11110 |
| 11111 ... 11111 |

However, such a mass serialization is not secure. To increase security, mass serializations may be sequenced randomly. Generally, if MS(n) is the $n^{th}$ item in a serialization, there is a preference that, MS(n+1)≠MS(n)+1. There is a further preference for no detectable relationship between MS(n) and MS(n+1).

BRIEF DESCRIPTION OF THE DRAWINGS

Certain embodiments are described in the following detailed description and in reference to the drawings, in which.

DETAILED DESCRIPTION

Figure 1:
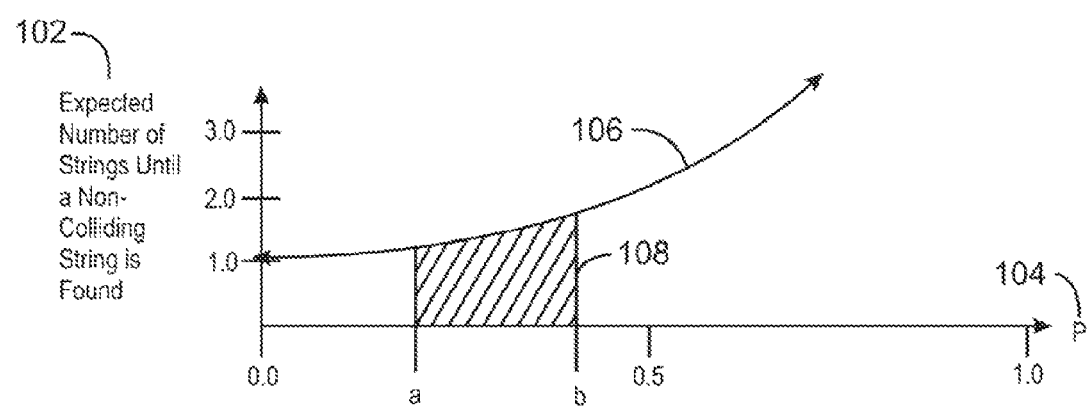
FIG. 1 is a graph representing an expected number of collisions during population of a mass serialized set (MSS) in accordance with an embodiment.

The effective randomness of a mass serialization may be determined by calculating a Hamming Distance (HD) between two strings in the serialization. The HD between MS(n) and MS(n+1) is an XOR operation, as shown in Equation 1.

$$XOR(MS(n+1),MS(n))=\Sigma_{i=1}^{L} MS_{n+1}(i) \otimes MS_n(i) \quad \text{EQUATION 1}$$

Determining the HD for a mass serialization may provide a binomial distribution of HD's for each string. For there to be no detectable relationship between MS(n) and MS(n+1), the binomial distribution may have a mean of L/2, and a standard deviation of L/4, where L represents the length of each string in the serialization. For example, if L=128, then the Hamming Distance, between strings MS(n+1) and MS(n), is a population with (mean,std) or $(\mu,\sigma)$ of $(64,4\sqrt{2})$ or (64,5.657).

If the sequences MS(n+1) and MS(n) are sequential, as shown in Table 1, then the HD is typically less than 2. Thus, a mean HD<L/2 may be indicative of a non-random mass serialization. Similarly, a mean HD>L/2 may be indicative of a non-random mass serialization. This may also be true for variances that are statistically significantly different from L/4.

To increase the HD and thus make MS(n+1) more difficult to predict given {MS(0), MS(1), ..., MS(n)}, the sequential set shown in Table 1 may be replaced with an associated set of "randomized" codes, as shown in Table 2.

TABLE 2

| |
|---|
| 10111 ... 01100 |
| 00010 ... 01110 |
| ... |
| 00100 ... 11000 |

The Hamming Distance between two binary strings, $BS_1$ and $BS_2$, of length L may be represented as $HD_L$, as shown in Equation 2.

$$HD_L=\Sigma_{i=1}^{L} BS_1(i) \otimes BS_2(i) \quad \text{EQUATION 2}$$

Thus, for a secure mass serialization, the expected value, E, of HD for strings of length L, may be represented as E(HD($BS_1(L),BS_2(L)$))=L/2, as described above for the mean, $\mu$. In shorthand, the expected value E(*) may be represented as shown in Equation 3.

$$E(HD(BS_1(L),BS_2(L)))=E(HD_L)=\mu(HD_L)=L/2 \quad \text{EQUATION 3}$$

With appropriately random mass serialization, $E(HD_L)$ may be independent of the distance between any two binary strings $BS_1$ and $BS_2$ in the serialization. Advantageously, using HD and entropy measures may be effective for uncovering flawed mass serialization, e.g., which is not fully secure. For example, Equation 4 describes the entropy of run-lengths for 0's and 1's in a binary string:

$$e=-\Sigma p_i \times \log_2(p_i) \quad \text{EQUATION 4}$$

For i=1, ..., ∞, and where $p_i$=the percent of runs of length l, and thus={0.5, 0.25, 0.125, 0.0625, ... } for i={1, 2, 3, 4 ... }. For a fully entropic binary string, e=2.0.

In one embodiment, an overall single system metric may be used to compare different mass serialization approaches. The metric may be a serialization-based analytic for determining the effective randomness of mass serializations. This metric may be used to test the effective randomness of processes such as random-number generation, scrambling, and encryption. Generally, for these processes, the more effective the randomness, the more secure the serializations are.

The metric may also be used to test mass serialization engines. Mass serialization engines may generate mass serializations such as, unique identifiers (IDs) for large sets of items. The metric may further provide a simple means to generate mass serialized numbers while avoiding collision (replication of a unique ID) and ensuring that mass serialized strings have a cryptographic level of randomness.

For a mass serialization engine to be cryptographically secure, the odds of generating a duplicate string may be directly proportional to a percent of possible strings that currently exist in the mass serialized set (MSS). Thus, any significant deviation from this probability may be a manifestation of a threat surface. This deficiency in effective randomness may be potentially exploited to compromise the mass serialization. The proportional relationship may describe the likelihood that a mass serialization generates a duplicate string at each point, p, of a mass serialization. The point, p, may represent the population percentage of the MSS at any moment of the serialization. For example, where p=0.5, the mass serialization may be half-complete. In other words, the MSS is half populated, e.g., 64 of 128 binary strings have been generated. The expected number of candidate strings that may be evaluated to find a non-duplicate may be represented by Equation 5.

$$f(p) = \frac{1}{1-p} \qquad \text{EQUATION 5}$$

Accordingly, the expected number of collisions, EC(p), before finding a new BS at point p may be represented by Equation 6:

$$EC(p) = \frac{1}{1-p} - 1 = \frac{p}{1-p} \qquad \text{EQUATION 6}$$

For example, using Equation 6, EC(0.5)=1. In a mass serialization of binary strings of length 1, only two possible strings may be generated, 0 and 1. If one string is already generated, on the average (mean) it is expected to take two attempts to generate a non-duplicate binary string of length 1. In such a case, the expected number of collisions may be 1.

FIG. 1 is a graph 100 representing the expected number of collisions during population of a MSS in accordance with an embodiment. The graph includes an a y-axis 102, x-axis 104, a curve 106, and region 108. The y-axis 102 represents the expected number of collisions at point p. The x-axis 104 represents the range of values for point p, a portion of the MSS that is currently populated. The curve 106 represents f(p) described in Equation 5.

The region 108 represents an integral of f(p) between points a and b of the mass serialization. The region 108 may represent a statistically relevant set of new entries for the MSS (and collisions). These entries may be created by increasing the size of the MSS from a % to b % of the total number of binary strings, as illustrated in FIG. 1. The integral represents the expected number of total collisions between points a and b of the mass serialization. The region 108 may be represented by Equation 7.

$$\int_a^b \frac{1}{1-x} dx = \ln(1-a) - \ln(1-b) \qquad \text{EQUATION 7}$$

There are $256^B$ possible binary strings in a string of B bytes. Accordingly, for mass serializations of binary strings, the expected number of collisions in moving from a to b may be represented as EC(a→b), in Equation 8.

$$EC(a \to b) = (\ln(1-a) - \ln(1-b) - (b-a)) \times (256^B) \qquad \text{EQUATION 8}$$

For example, if a=0.25, b=0.75 and B=2, then EC(a→b)= (1.09861−0.5)*65,536=39,231.

As stated previously, whether a mass serialization is cryptographically secure may be determined based on whether the occurrence of collisions exceeds the likelihood of collisions. In one embodiment, a method may be performed for determining whether a mass serialization is cryptographically secure.

Figure 2:
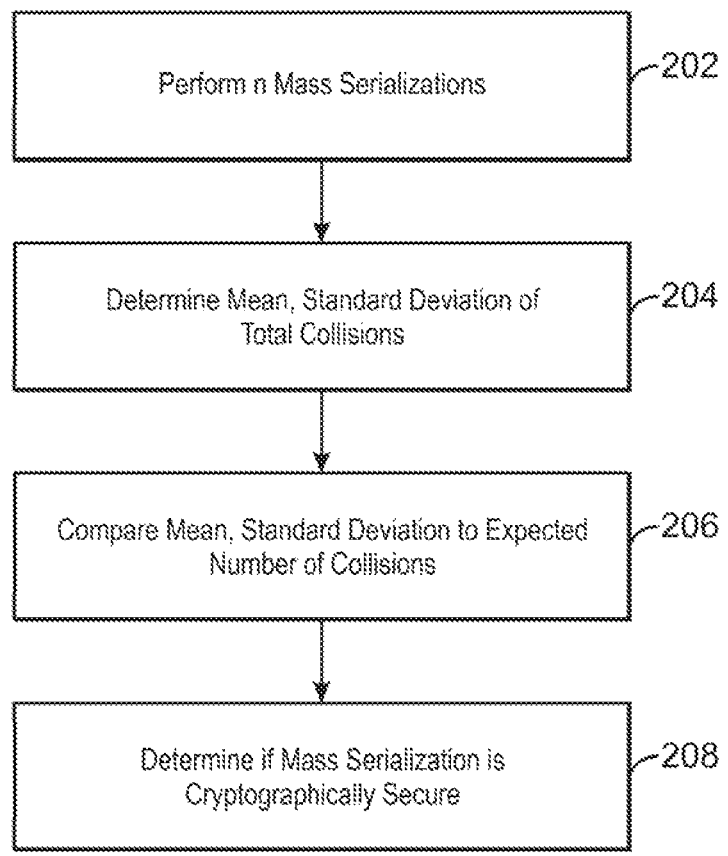
FIG. 2 is a process flow diagram of a method for determining whether a mass serialization engine is cryptographically secure in accordance with an embodiment.

FIG. 2 is a process flow diagram of a method 200 for determining whether a mass serialization engine is cryptographically secure in accordance with an embodiment. It should be understood that the process flow diagram is not intended to indicate a particular order of execution. The method 200 begins at block 202, where a predetermined number, n, of mass serializations may be performed by a mass serialization engine. The block 202 is described further with respect to FIG. 3, which is a process flow diagram of a method 300 for performing a mass serialization in accordance with an embodiment.

At block 204 the mean and standard deviation of the total number of collisions may be determined for all n iterations. At block 206, the mean and standard deviation may be compared to the expected number of total collisions, described with respect to Equation 8. At block 208, it may be determined whether the mass serialization is cryptographically secure. As stated previously, variances in the mean and standard deviation from the expected number of collisions may indicate the mass serialization engine is not cryptographically secure.

Figure 3:
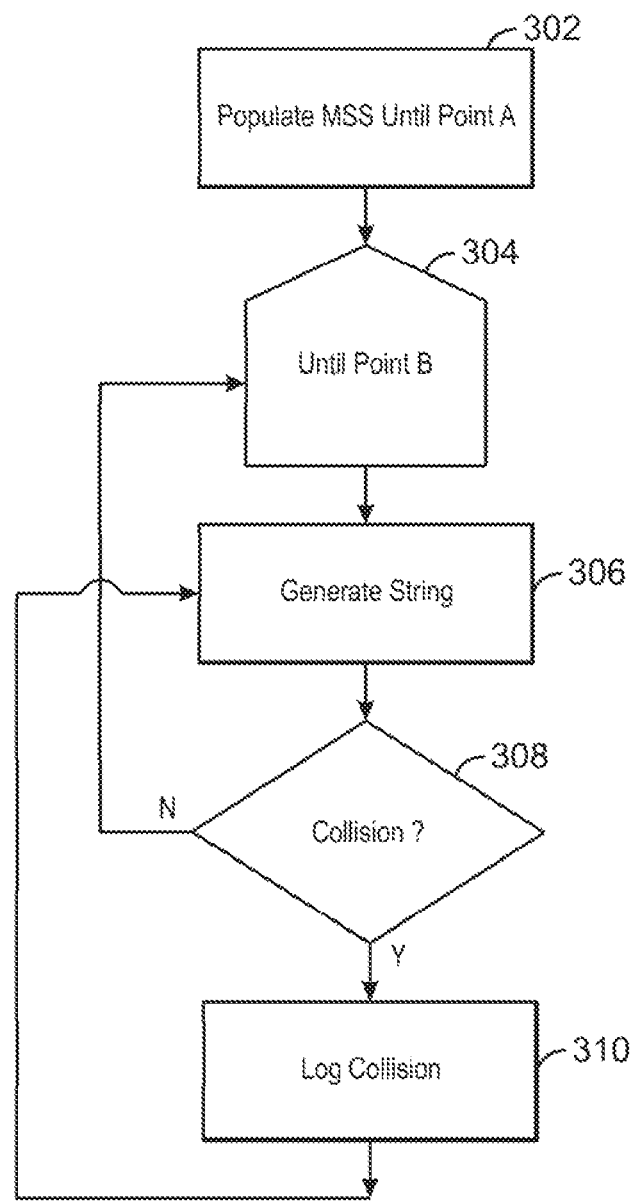
FIG. 3 is a process flow diagram of a method for performing a mass serialization in accordance with an embodiment.

FIG. 3 is a process flow diagram of a method 300 for performing a mass serialization in accordance with an embodiment. The method 300 may be performed for each of the n iterations. The method 300 begins at block 302, where a MSS may be populated until a certain point "a."

Blocks 304-310 may be repeated while the MSS is increased from point a to another point, "b." At block 306, a binary string of length $L_B$ may be generated, where B represents the length in bytes. At block 308, it may be determined whether the new string represents a collision. If so, at block 310, the collision may be logged. The method 300 may then flow to block 306, where another string may be generated. The re-generation of strings may continue until a string unique to the current MSS is generated. When the MSS has progressed to point b, the method 300 may be repeated for the next of the n iterations.

As an example, two mass serialization engines were tested. In the example, the number of bytes for the string, B, was set to 2. Accordingly, $256^B$, from Equation 8, equals 65,536. Further, three different sets of {a,b} were used: {0.25,0.50}, {0.25,0.75}, and {0.50,0.75}, as shown in Table 3.

TABLE 3

| a | p(a) | B | p(b) |
|---|---|---|---|
| .25 | 16384 | .50 | 32768 |
| .25 | 16384 | .75 | 49152 |
| .50 | 32768 | .75 | 49152 |

The number of non-colliding strings of the MSS for the three {a,b} combinations are shown in Table 3. After creating p(a) unique byte-strings, the incremental 16384 or 32788 unique byte strings were created to result in p(b) unique strings. The number of collisions found when using a mass serialization engine A, and another engine B were recorded for 100 iterations at each combination of {a,b}. The expected and observed number of collisions for the three {a,b} combinations are shown in Table 4:

TABLE 4

| A | B | Expected Collisions | Engine A Collisions | Engine B Collisions |
|---|---|---|---|---|
| .25 | .50 | 10189 | 10276 ± 570 | 10208 ± 137 |
| .25 | .75 | 39231 | 40197 ± 1430 | 39240 ± 328 |
| .50 | .75 | 29042 | 29451 ± 1483 | 29081 ± 312 |

In the following description, Z represents a standard statistical z test, where the absolute value of difference in means is divided by the standard deviation multiplied by the square root of the number of iterations. Further, T is the output of a standard one-tailed student's t test, and NS=not significant at a probability of 95% certainty (alpha=0.05 in a t-table. According to the results in Table 4, for engine A, the mean±standard deviation, z, equals 1.526, where the probability that the difference is not statistically significant, (ps=0.0635, NS), 6.755 (p=10–6) and 2.758 (p=0.0029), respectively, for the three combinations (0.25,0.50), (0.25, 0.75) and (0.50,0.75). For the engine B, (z=1.387, (ps=0.0828, NS), 0.274 (ps=0.392, NS) and 1.250 (p=0.1056, NS), respectively. For engine A, the differences in standard deviation of (ps<10-12) for all three comparisons, are significant, indicating engine A is not cryptographically secure. In comparison, for engine B, t=1.16 (ps≈0.12, NS), t=6.52 (ps<10–6), and t=2.44 (ps≈0.008), respectively. Thus, engine B is more secure than engine A.

In another embodiment, engines A and B were tested in combination to generate the first 16,384 byte-strings were performed. The tests and results are shown in Table 5:

TABLE 5

| First 0.25 generated using | Next 0.50 generated using | Collision mean and standard deviation |
|---|---|---|
| Engine A/Engine B oscillate | Engine A | 40197 ± 1430 |
| Engine A/Engine B oscillate | Engine B | 39260 ± 296 |
| Engine A | Engine B | 39237 ± 275 |
| Engine B | Engine A | 40231 ± 1153 |

In the example embodiment, the expected number of collisions was 39,231. As shown, the number of collisions in creating the next 0.50 of the MSS seems to depend more on the algorithm for the next 0.50 rather than that for the first 0.25. This may indicate that fast initial assignments of N byte-strings may be OK when $N \ll 256^B$. In other words, the difference in the number of collisions observed from the number of collisions theoretically expected is small when the value of N is small.

In another example embodiment, a mass serialization engine C was compared to engine B. The results are shown in Table 6.

TABLE 6

| a | B | Expected collisions | Collisions using Engine C | Collisions using Engine B |
|---|---|---|---|---|
| 0.25 | 0.75 | 39231 | 39244 ± 331 | 39240 ± 328 |

As shown, the results from engine C are statistically indistinguishable from those of engine B, indicating the engine C is as cryptographically secure as engine B.

These data show that mass serialization cryptography security vulnerabilities may be uncovered with a simple mathematical model-based attack. The same approach may be used to gage the suitability of other algorithms, such as random number generators, including novel sensor combinations, scrambling algorithms, hashing algorithms, and encryption algorithms. This may enable the assessment of the suitability of a third party's mass serialization software. Advantageously, this approach is more sensitive than the standard NIST and DieHard methods.

Figure 4:
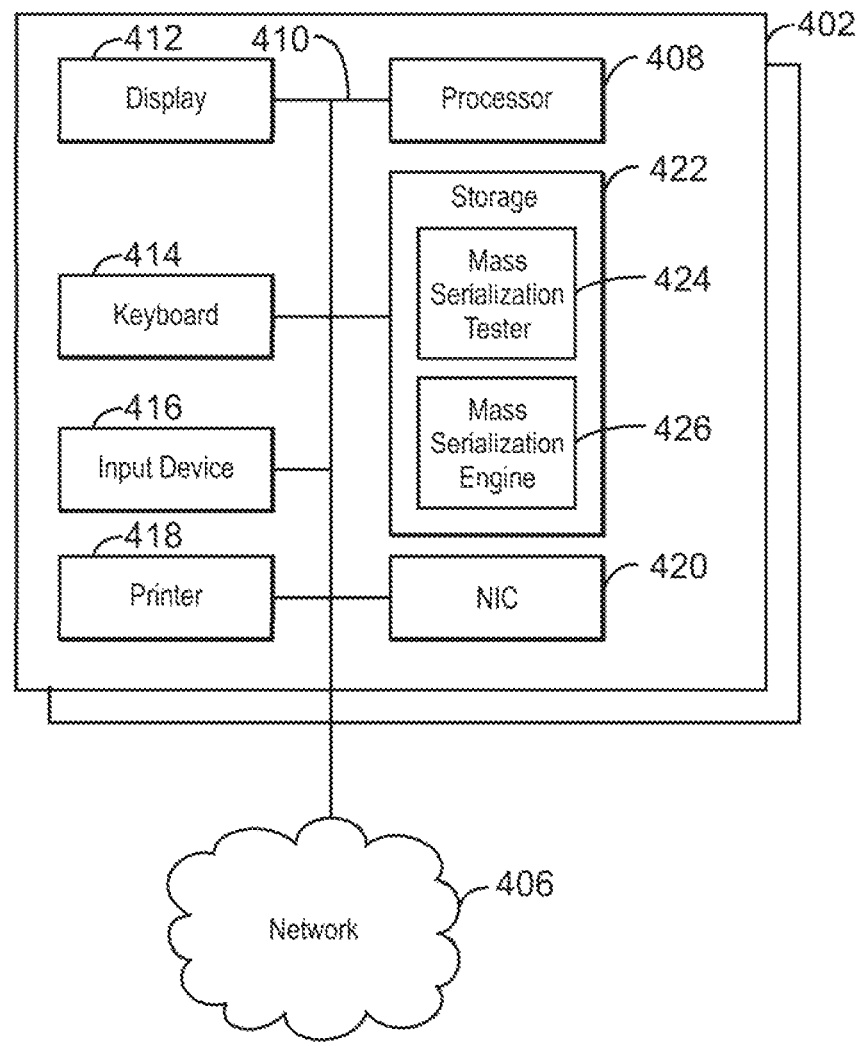
FIG. 4 is a block diagram of a system for determining whether a mass serialization engine is cryptographically secure in accordance with an embodiment.

FIG. 4 is a block diagram of a system 400 for determining whether a mass serialization engine is cryptographically secure in accordance with an embodiment. The functional blocks and devices shown in FIG. 4 may comprise hardware elements, software elements, or some combination of software and hardware. The hardware elements may include circuitry. The software elements may include computer code stored on a non-transitory, computer-readable medium. Additionally, the functional blocks and devices of the system 400 are but one example of functional blocks and devices that may be implemented in an embodiment. Specific functional blocks may be defined based on design considerations for a particular electronic device.

The system 400 may include servers 402 in communication with, or otherwise coupled to a network 406. The servers 402 may include a processor 408, which may be connected through a bus 410 to a display 412, a keyboard 414, an input device 416, and an output device, such as a printer 418. The input devices 416 may include devices such as a mouse or touch screen. The servers 402 may also be connected through the bus 410 to a network interface card 420. The network interface card 420 may connect the servers 402 to the network 406.

The network 406 may be a local area network, a wide area network, such as the Internet, or another network configuration. The network 406 may include routers, switches, modems, or any other kind of interface device used for interconnection. In one example embodiment, the network 406 may be the Internet.

The servers 402 may have other units operatively coupled to the processor 412 through the bus 410. These units may include non-transitory, computer-readable storage media, such as storage 422. The storage 422 may include media for the long-term storage of operating software and data, such as hard drives. The storage 422 may also include other types of non-transitory, computer-readable media, such as read-only memory and random access memory.

The storage 422 may include the machine readable instructions used in embodiments of the present techniques. In an embodiment, the storage 422 may include a mass serialization tester 424, and a mass serialization engine 426. The serialization tester 424 may perform functionality described herein with respect to determining whether the serialization engine 426 is cryptographically secure.

Figure 5:
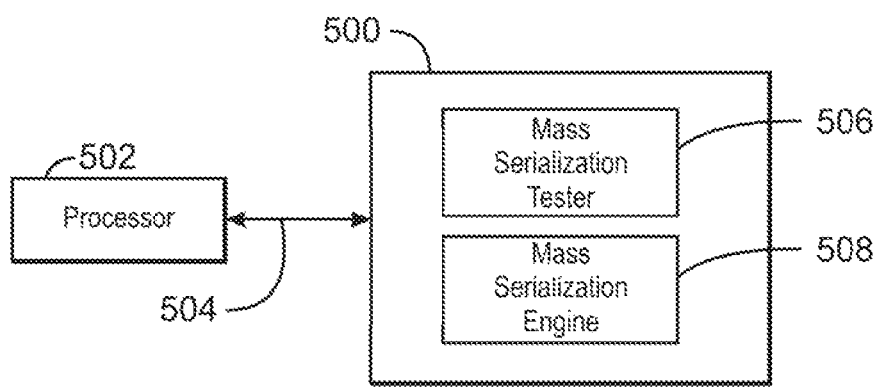
FIG. 5 is a block diagram showing a non-transitory, computer-readable medium that stores code for determining whether a mass serialization engine is cryptographically secure in accordance with an embodiment.

FIG. 5 is a block diagram showing a non-transitory, computer-readable medium that stores code for determining whether a mass serialization engine is cryptographically secure in accordance with an embodiment. The non-transitory, computer-readable medium is generally referred to by the reference number 500.

The non-transitory, computer-readable medium 500 may correspond to any typical storage device that stores computer-implemented instructions, such as programming code or the like. For example, the storage device may include a hard disk drive, a magnetic disk drive, e.g., to read from or write to a removable magnetic disk, or an optical disk drive, e.g., for reading a CD-ROM disk or to read from or write to other optical media. Further, other types of media that are readable by a computer system and that are suitable to the desired end purpose may be used, such as magnetic cassettes, flash memory cards, digital video disks, Bernoulli cartridges, and the like.

The storage device may be connected to a system bus by a storage device interface, such as a hard disk drive interface, a magnetic disk drive interface, or an optical drive interface. For example, the storage device may be the storage 422 discussed with respect to FIG. 4.

When read and executed by a processor 502 via a communication path 504, the instructions stored on the non-transitory, computer-readable medium 500 are adapted to cause the processor 502 to process notifications according to an example embodiment, as described herein. The non-transitory, computer-readable medium 500 may include a mass serialization engine 508, and a mass serialization tester 506.

The mass serialization engine 508 may perform a specified number of mass serializations to generate a corresponding number of mass serialization sets. The mass serialization tester 506 may determine a total number of collisions occurring while a size of the mass serialization sets are increased from a first portion to a second portion. The mass serialization tester 506 may determine a mean and standard deviation of the total number of collisions. The mass serialization tester 506 may compare the mean and standard deviation to an expected number of collisions. Whether the mass serialization engine 508 is cryptographically secure may be determined based on the comparison.

What is claimed is:

1. A method, comprising:
    performing, via a mass serialization tester of a storage device, a specified number of mass serializations to generate a corresponding number of mass serialization sets, wherein a size of the mass serialization sets is increased from a first portion size to a second portion size by a mass serialization engine, and wherein the storage device comprises the mass serialization tester and the mass serialization engine;
    generating, via the mass serialization tester of a storage device, a plurality of binary strings to populate each of the mass serialization sets, wherein the mass serialization sets are of a specified size, and wherein there are $256^B$ possible binary strings, where B represents a length of the binary strings in bytes;
    determining, via the mass serialization tester of a storage device, whether each of the plurality of binary strings results in an expected number of collisions;
    determining, via the mass serialization tester of a storage device, a corresponding number of collisions for each of the specified number of mass serializations;
    incrementing, via the mass serialization tester of a storage device, the corresponding number of collisions for the corresponding mass serialization sets if a collision occurs while the corresponding mass serialization sets are being increased from the first portion size to the second portion size;
    comparing, via the mass serialization tester of a storage device, the corresponding number of collisions to the expected number of collisions; and
    determining, via the mass serialization tester of a storage device, whether the mass serialization engine is cryptographically secure based on the comparison.

2. The method recited in claim 1, wherein determining whether the mass serialization engine is cryptographically secure comprises:
    determining, via the mass serialization tester of a storage device, a mean and standard deviation of the corresponding number of collisions;
    comparing, via the mass serialization tester of a storage device, the mean and the standard deviation to the expected number of collisions; and
    determining, via the mass serialization tester of a storage device, whether the mass serialization engine is cryptographically secure is based on the comparison using the mean and standard deviation.

3. The method recited in claim 1, wherein each of the mass serialization sets comprise a plurality of binary strings.

4. The method recited in claim 3, wherein the expected number of collisions comprises $(\ln(1-\text{first portion})-\ln(1-\text{second portion})-(\text{second portion}-\text{first portion}))*(256^B)$.

5. The method recited in claim 1, wherein the mass serialization engine is one of:
    a random number generator;
    a random number generator using a novel sensor combination;
    an encryption algorithm;
    a scrambling algorithm; and
    a hashing algorithm.

6. The method recited in claim 1, wherein determining whether the mass serialization engine is cryptographically secure comprises:
    determining, via a mass serialization tester of a storage device, that a variance between the corresponding number of collisions and the expected number of collisions is statistically significant; and
    determining, via a mass serialization tester of a storage device, that the mass serialization engine is not cryptographically secure.

7. The method recited in claim 1, wherein determining whether the mass serialization engine is cryptographically secure comprises:
    determining, via a mass serialization tester of a storage device, that a variance between the corresponding number of collisions and the expected number of collisions is not statistically significant; and
    determining, via a mass serialization tester of a storage device, that the mass serialization engine is cryptographically secure.

8. A computer system for processing notifications, comprising:
    an event processing pipeline, comprising:
        a storage device storing instructions;
        a processor configured to execute the instructions to:
            perform a specified number of mass serializations to generate a corresponding number of mass serialization sets comprising a plurality of binary strings using a mass serialization tester of a storage device, wherein a size of the mass serialization sets is increased from a first portion size to a second portion size by a mass serialization engine, wherein the storage device comprises the mass serialization tester and the mass serialization engine, and wherein the storage device comprises the mass serialization tester and the mass serialization engine;
            determine a corresponding number of collisions for each of the specified number of mass serializations using the mass serialization tester of a storage device;
            compare the number of collisions to an expected number of collisions using the mass serialization tester of a storage device, wherein the expected number of collisions comprises $(\ln(1-\text{first portion})-\ln(1-\text{second portion})-(\text{second portion}-\text{first portion}))*(256^B)$, where B represents a length of the binary strings in bytes; and
            determine whether the mass serialization engine is cryptographically secure based on the comparison using the mass serialization tester of a storage device.

9. The computer system recited in claim 8, wherein the processor is configured to execute the instructions to determine whether the mass serialization engine is cryptographically secure by executing instructions to:
    determine a mean and standard deviation of the number of collisions using the mass serialization tester of a storage device;

compare the mean and the standard deviation to the expected number of collisions using the mass serialization tester of a storage device; and determine whether the mass serialization engine is cryptographically secure and is based on the comparison using the mean and standard deviation using the mass serialization tester of a storage device.

10. The computer system recited in claim 8, wherein the processor executes instructions to perform the specified number of mass serializations by executing instructions to:

generate a plurality of binary strings to populate each of the mass serialization sets using the mass serialization tester of a storage device, wherein the mass serialization sets are of a specified size;

determine whether each of the plurality of binary strings results in a collision using the mass serialization tester of a storage device; and increment the corresponding number of collisions for a corresponding mass serialization set using the mass serialization tester of a storage device if the collision occurs while the corresponding mass serialization set is being increased from the first portion size to the second portion size.

11. The computer system recited in claim 8, wherein the processor executes instructions to determine whether the mass serialization engine is cryptographically secure by executing instructions to:

determine that a variance between the number of collisions and the expected number of collisions is statistically significant using the mass serialization tester of a storage device; and determine that the mass serialization engine is not cryptographically secure using the mass serialization tester of a storage device.

12. The computer system recited in claim 8, wherein the processor executes instructions to determine whether the mass serialization engine is cryptographically secure by executing instructions to:

determine that a variance between the number of collisions and the expected number of collisions is not statistically significant using the mass serialization tester of a storage device; and determine that the mass serialization engine is cryptographically secure using the mass serialization tester of a storage device.

13. A non-transitory, computer-readable medium comprising machine-readable instructions executable by a processor to:

perform a specified number of mass serializations to generate a corresponding number of mass serialization sets comprising a plurality of binary strings using a mass serialization tester of a storage device, wherein a size of the mass serialization sets is increased from a first portion size to a second portion size by a mass serialization engine, and wherein the storage device comprises the mass serialization tester and the mass serialization engine;

determine a corresponding number of collisions for each of the specified number of mass serializations using the mass serialization tester of a storage device;

compare the number of collisions to an expected number of collisions, wherein the expected number of collisions comprises $(\ln(1-\text{first portion})-\ln(1-\text{second portion})-(\text{second portion}-\text{first portion}))*(256^B)$ using the mass serialization tester of a storage device, where B represents a length of the binary strings in bytes; and determine whether the mass serialization engine is cryptographically secure based on the comparison using the mass serialization tester of a storage device.

14. The non-transitory, computer-readable medium recited in claim 13, wherein the machine-readable instructions which, when executed by the processor, cause the processor to determine whether the mass serialization engine is cryptographically secure comprise machine-readable instructions which, when executed by the processor, cause the processor to:

determine a mean and standard deviation of the number of collisions;

compare the mean and the standard deviation to the expected number of collisions;

determine whether the mass serialization engine is cryptographically secure is based on the comparison using the mean and standard deviation;

generate a plurality of binary strings to populate each of the mass serialization sets, wherein the mass serialization sets are of a specified size;

determine whether each of the plurality of binary strings results in a collision; and increment the corresponding number of collisions for a corresponding mass serialization set if the collision occurs while the corresponding mass serialization set is being increased from the first portion size to the second portion size.

* * * * *